(12) United States Patent
De Wilde et al.

(10) Patent No.: US 8,629,392 B2
(45) Date of Patent: Jan. 14, 2014

(54) DEVICE AND METHOD FOR PREVENTING DETECTION OR SPEED DETECTION BY EXTERNAL LASER MEASURING APPARATUS WITH A TRANSMISSION SURFACE ORIENTED SUBSTANTIALLY TRANSVERSELY TO THE DRIVING DIRECTION OF A CONNECTED VEHICLE

(75) Inventors: Tom Marnix Alexander De Wilde, Hillegom (NL); Patrick Dijkstra, Driebruggen (NL)

(73) Assignee: Stiching Noble House, Hillegom (NL)

( * ) Notice: Subject to any disclaimer, the term of this patent is extended or adjusted under 35 U.S.C. 154(b) by 279 days.

(21) Appl. No.: 13/124,313

(22) PCT Filed: Oct. 20, 2009

(86) PCT No.: PCT/NL2009/050634
§ 371 (c)(1),
(2), (4) Date: Jun. 29, 2011

(87) PCT Pub. No.: WO2010/047589
PCT Pub. Date: Apr. 29, 2010

(65) Prior Publication Data
US 2012/0126093 A1 May 24, 2012

(30) Foreign Application Priority Data
Oct. 20, 2008 (NL) ...................................... 2002115

(51) Int. Cl.
*H01J 40/14* (2006.01)
(52) U.S. Cl.
USPC ...................................... 250/221; 250/206.1
(58) Field of Classification Search
USPC ........................ 250/221, 214.1, 214 R, 206.1; 342/59–81, 90, 27, 28, 14, 13; 356/28, 356/28.5, 5.01; 340/435–439, 901–907
See application file for complete search history.

(56) References Cited

U.S. PATENT DOCUMENTS

| | | | |
|---|---|---|---|
| 3,436,540 A | 4/1969 | Lamorlette | |
| 5,239,296 A | 8/1993 | Jenkins | |
| 5,767,954 A | 6/1998 | Laakmann | |
| 5,793,477 A * | 8/1998 | Laakmann | ...................... 356/28 |
| 2003/0206286 A1 | 11/2003 | Bogh-Andersen | |
| 2007/0236382 A1 | 10/2007 | Dove | |

FOREIGN PATENT DOCUMENTS

| | | |
|---|---|---|
| DE | 3609834 A1 | 9/1987 |
| EP | 0339988 A2 | 11/1989 |
| FR | 2523341 A1 | 9/1983 |
| WO | 9721110 A1 | 6/1997 |
| WO | 9805016 A | 2/1998 |

* cited by examiner

*Primary Examiner* — Que T Le
(74) *Attorney, Agent, or Firm* — The Webb Law Firm

(57) ABSTRACT

A vehicle with a device including a central processing unit, at least one detector with at least one detection surface and designed for detecting, in a detection direction, laser pulses or a light beam coming from an external measuring apparatus which emits laser pulses or light beams for the purpose of detecting a vehicle and/or measuring the speed of a vehicle, and at least one transmitter with a transmission surface and which is designed for transmitting light pulses in a transmission direction that is substantially the same as said detection direction. The central processing unit causes the transmitter to transmit a series of light pulses upon detection of laser pulses or a light beam. The detection surface and the transmission surface are oriented substantially transversely to the driving direction of the vehicle.

17 Claims, 2 Drawing Sheets

DEVICE AND METHOD FOR PREVENTING DETECTION OR SPEED DETECTION BY EXTERNAL LASER MEASURING APPARATUS WITH A TRANSMISSION SURFACE ORIENTED SUBSTANTIALLY TRANSVERSELY TO THE DRIVING DIRECTION OF A CONNECTED VEHICLE

BACKGROUND OF THE INVENTION

1) Field of the Invention

The invention relates to a vehicle provided with a device that comprises a central processing unit, at least one detector connected to said central processing unit, which detector comprises at least one detection surface and which is designed for detecting, in a detection direction, laser pulses or a light beam coming from external measuring apparatus which emits said laser pulses or light beam for the purpose of detecting a vehicle and/or measuring the speed of a vehicle, and at least one transmitter connected to the central processing unit, which transmitter comprises a transmission surface and which is designed for transmitting light pulses in a transmission direction that is substantially the same as said detection direction, which central processing unit is designed for causing the transmitter to transmit a series of light pulses upon detection of laser pulses or a light beam.

2) Description of the Prior Art

Such a device is described in International patent publication WO 97/21110, which publication is considered to be incorporated herein. Said device is suitable for disturbing speed measurements of vehicles, in which use is made of laser guns which are directed at the front or the rear of the vehicle, thereby making it difficult or altogether impossible to measure the vehicle speed. However, said device is not suitable, or at least less suitable, for disturbing a speed measurement in which use is made of a device as described in International patent publication WO 98/05016, which publication is likewise considered to be incorporated herein, which device comprises two laser transmitters disposed a short distance (for example 400 mm) apart, which are directed at the car from aside, wherein the time is measured which the vehicle needs for covering said distance. Patent publications EP 0 339 988, FR 2 523 341 and U.S. Pat. No. 3,436,540 present comparable devices, in which laser transmitters or light-sensitive photocells are directed at the vehicle at an angle from above and perpendicularly from above, respectively, transversely to the driving direction of the vehicle.

SUMMARY OF THE INVENTION

An object of the invention is to provide a device which is actually suitable, or at least more suitable, for disturbing the aforesaid speed measurements.

In order to accomplish that object, the detection surface and the transmission surface are connected to the vehicle in such a manner that they are oriented substantially transversely to the driving direction of the vehicle. The device is thus capable of preventing speed measurements being carried out from the side, the upper side or the bottom side of the vehicle.

Preferably, the detection surface is provided near the front and/or near the rear of the vehicle. More preferably, the centre of the detection surface is removed from the front or the rear of the vehicle by less than 40 cm, preferably less than 20 cm, more preferably less than 10 cm, even more preferably less than 5 cm. The detection surface is for example mounted in, on or near the front bumper and/or the rear bumper of the vehicle. In a special preferred embodiment, the detection surface is mounted in the front number plate holder of the vehicle. It has been found that if the detection surface is mounted in the transverse direction to or at least very close to the extreme front side and/or the rear side of the vehicle, the device will be capable of responding sufficiently quickly for interfering with a speed measurement in which the front or the rear of the vehicle is detected.

Preferably, the transmission surface is provided near the front and/or near the rear of the vehicle. The device preferably comprises at least two transmission surfaces, oriented parallel to each other, for each detector, the first transmission surface being mounted near the front of the vehicle and the second transmission surface being mounted near the rear of the vehicle. Because the speed measuring device described in WO 98/05016 measures not only the speed of the front of the vehicle but also the speed of the rear of the vehicle, with the measurement being valid only if the same speed is measured in both cases, it is also possible to disturb the speed measurement by disturbing only the measurement of the rear of the vehicle.

This can be realised by means of a transmission surface near the rear side, a possible advantage being the fact that there is more time to activate the transmitter upon detection of the laser pulses. The central processing unit is preferably designed for causing the transmission surface provided near the front of the vehicle to transmit said series of light pulses immediately after the detector has detected laser pulses. The central processing unit is in that case, or alternatively, designed for causing the transmission surface that is provided near the rear of the vehicle to transmit the series of light pulses after the detector has detected the laser pulses, in any case within a time period that ranges between about 30 ms and about 1300 ms after detection of the laser pulses. This is the time that elapses between passage of the front and the rear of a vehicle having a length ranging between 2.5 m and 18 m, at driving speeds between 50 km/h and 300 km/h. The central processing unit is preferably designed for determining the moment in time of the transmission of the series of laser pulses in dependence on the speed of the vehicle and/or the length of the vehicle. In an alternative embodiment, the detection surface is provided near the rear of the vehicle, and the transmission surface transmits immediately upon detection of the laser pulses.

The invention also relates to a vehicle provided with a device comprising a central processing unit, at least one transmitter connected to said central processing unit, which transmitter comprises a transmission surface and which is designed for transmitting light pulses in a transmission direction, which central processing unit is designed for causing the transmitter to transmit a series of light pulses, wherein the transmission surface is connected to the vehicle in such a manner that it is oriented substantially transversely to the driving direction of the vehicle, and the transmission surface is connected near the front or near the rear of the vehicle. The transmitter is continuously activated in this case, for example as long as a vehicle is driving at a speed higher than a predetermined speed.

The invention further relates to a method for fitting a vehicle with a device comprising a central processing unit, at least one transmitter connected to said central processing unit, which transmitter comprises a transmission surface and which is designed for transmitting light pulses in a transmission direction, which central processing unit is designed for causing the transmitter to transmit a series of light pulses, characterised in that the transmission surface is connected to the vehicle in such a manner that it is oriented substantially transversely to the driving direction of the vehicle, wherein the transmission surface is provided near the front or near the rear of the vehicle.

Thus the following preferred variants exist:

| Detector | Transmitter |
|----------|-------------|
| Front | front |
| Rear | rear |
| Front | rear |
| None | front |
| None | rear |

Upon detection of a series of laser pulses, the central processing unit preferably determines the moment in time and the frequency of the first laser pulses of the series, and the central processing unit sets the frequency and the moment in time of the series of light pulses to be transmitted in dependence on said frequency, for example approximately the same frequency, or half or twice said frequency. The device is preferably designed for causing laser pulses to be transmitted at a varying interval within a specified range, for example a randomly varying interval within the 98-102 ms range if the pulse frequency of the external measuring apparatus is 10 kHz. By constantly varying the duration of the successive intervals, the measurement is disturbed to such a degree that the first measurement of the front and the rear of the vehicle and the second measurement of the front and the rear of the vehicle by the external measuring apparatus cannot produce the same result, thereby rendering the measurement invalid.

The detection surface is preferably oriented obliquely upwards at an angle of about 1-20 degrees, more preferably about 5 degrees, to the road surface. Furthermore, the detection surface, or one of the detection surfaces, is oriented obliquely forwards at an angle of 5 to 20 degrees, more preferably about 10 degrees. The forwardly oriented detection surface is preferably present near the side of the vehicle, being oriented at an angle across the front of the vehicle. A device having the above characteristics is quite suitable for preventing speed measurements by a device as described in WO 98/05016 and as marketed under the trade name Autovelox 105SE Speed Meter™ from Sodi Scientifica Traffic Division, with the detection of the laser pulses as well as the disturbing of the measurement taking place as reliably and as quickly as possible.

In the preferred embodiment, the detector comprises a glass fibre cable whose first end is mounted in front of the detector, facing towards said detector, and whose second end forms the detection surface, being provided with connecting means for connecting said second end to the vehicle in such a manner that laser pulses from the external measuring apparatus can be received by the second end of the glass fibre cable and be conducted to the detector. The device furthermore preferably comprises a light pulse generator, which light pulse generator is mounted in front of the first end of the glass fibre cable, being directed towards said first end, or a separate glass fibre cable for transmitting light pulses.

The device preferably comprises a number of glass fibre cables for detecting laser pulses from a number of sectors around the object, and the device preferably comprises a number of detectors, to each of which detectors a glass fibre cable is connected. Said detectors are preferably disposed within a central housing.

The glass fibre cable preferably comprises a plurality of parallel glass fibres, so that a flexible cable is obtained, which can be installed with a bend having a small radius. The glass fibre cable preferably has a cross-sectional area of 0.2-20 $mm^2$, more preferably 0.5-10 $mm^2$, even more preferably 0.5-2 $mm^2$.

The invention further relates to a method of fitting a vehicle with a device comprising a central processing unit, at least one detector connected to said central processing unit, which detector comprises at least one detection surface and which is designed for detecting, in a detection direction, laser pulses or a light beam coming from external measuring apparatus which emits said laser pulses for the purpose of measuring the speed of a vehicle, and at least one transmitter connected to the central processing unit, which transmitter comprises a transmission surface and which is designed for transmitting light pulses in a transmission direction that is substantially the same as said detection direction, wherein the central processing unit is designed for causing the transmitter to transmit a series of light pulses upon detection of laser pulses or a light beam by the detector, wherein the detection surface and the transmission surface are connected to the vehicle in such a manner that they are oriented substantially transversely to the driving direction of the vehicle.

BRIEF DESCRIPTION OF THE DRAWINGS

The invention will now be explained in more detail with reference to figures of a drawing, in which.

DETAILED DESCRIPTION OF THE PREFERRED EMBODIMENTS

Figure 1:
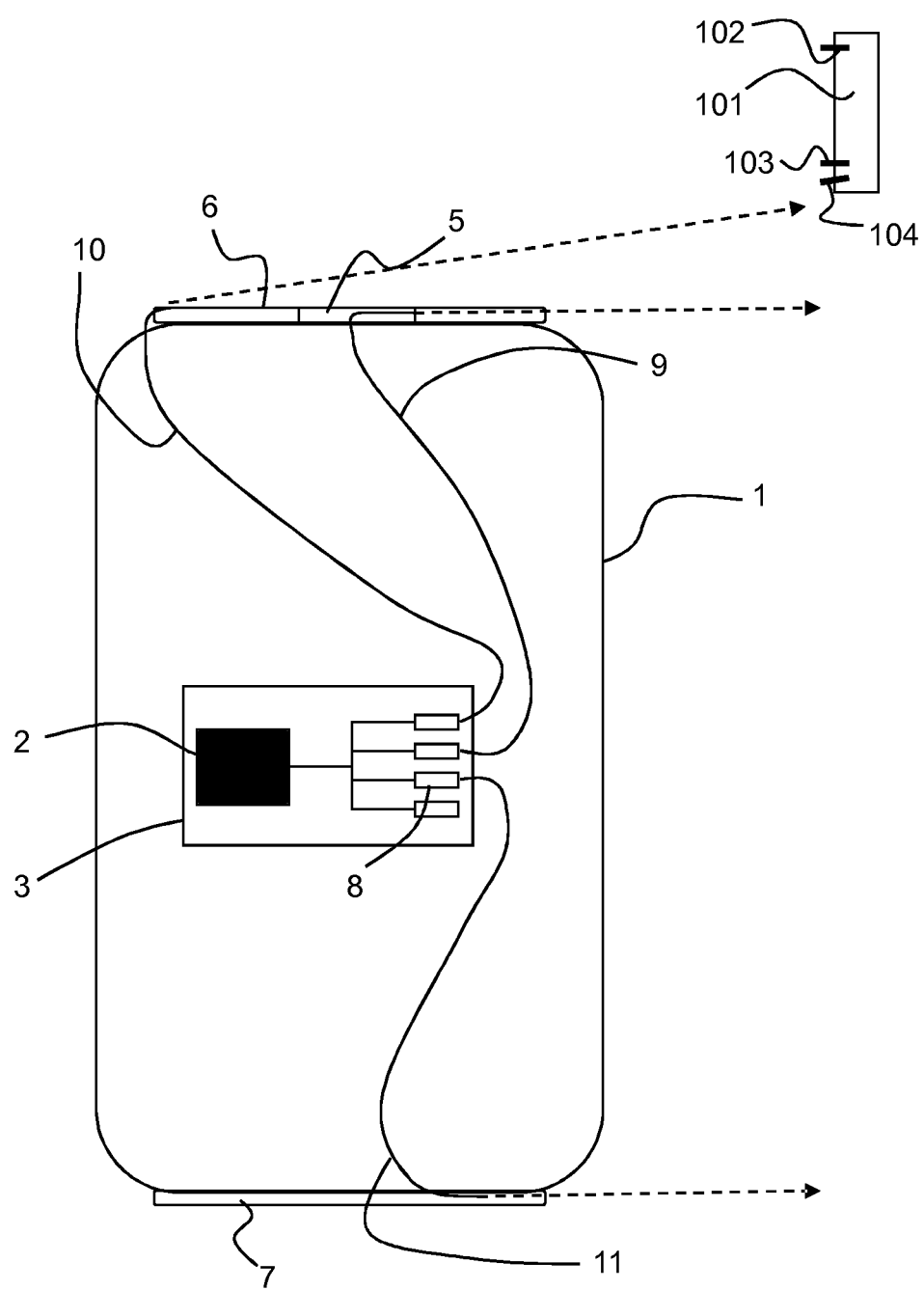
FIG. 1 is a schematic top plan view of a vehicle fitted with a device according to the invention.
Figure 2:
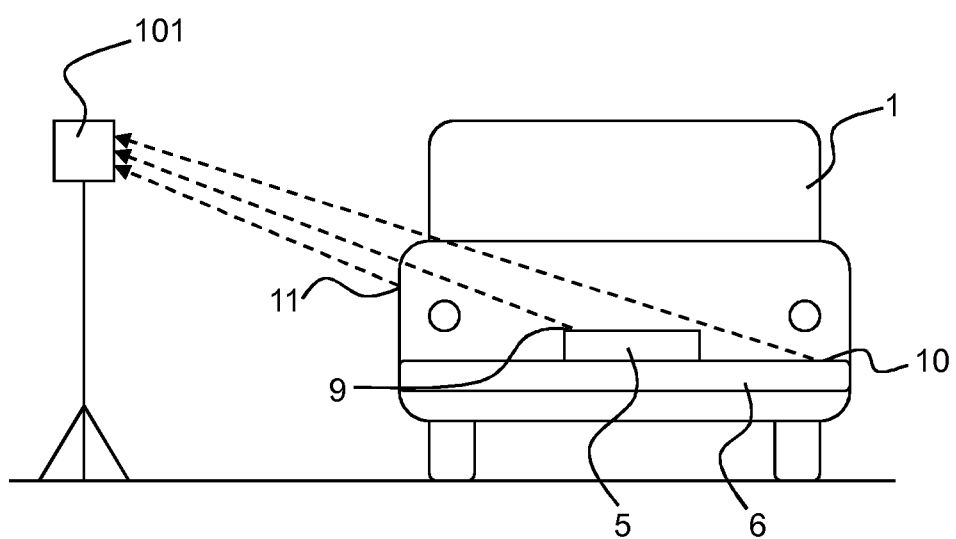
FIG. 2 is a schematic front view of a vehicle fitted with a device according to the invention.

The figures show a laser speed measuring device 101, which comprises two parallel laser transmitters 102, 103 and a third laser transmitter 104, which is oriented at an angle of about 10 degrees relative to the laser transmitter 103. The laser transmitters 102, 103, 104 extend downwards at an angle of about 10 degrees to the road surface. The operation of the laser speed measuring device 101 is described in WO 98/05016.

The vehicle 1 is provided with a housing 2, which accommodates a central processing unit 3. The central processing unit 3 is connected to four laser detectors/transmitters 8, which are capable of detecting the laser signal from an external laser speed measuring device.

The laser detectors/transmitters 8 are disposed within the housing 2 at a central location in the vehicle 1. A glass fibre cable 9, 10, 11 is connected to each detector/transmitter 8, in such a manner that laser pulses travelling through the glass fibre cables 9, 10, 11 and exiting the glass fibre cable at the end thereof can be incident on the detector 8, in such a manner that the laser pulses being transmitted by the transmitter 8 are incident on the end of the glass fibre cables 9, 10, 11 and travel through said cables. The glass fibre cables 9, 10, 11 each consist of a bundle of glass fibres having a total cross-sectional area of about 1 $mm^2$.

The other ends of the glass fibre cables 9, 10, 11 are connected to the outer side of the vehicle 1, in such a manner that they are directed towards four different sectors, wherein laser pulses from external laser apparatus from the four sectors can be incident on said ends, and laser pulses being transmitted by the detector/transmitter 8 can freely exit from the ends and propagate in the aforesaid sectors around the vehicle 1.

According to the invention, the ends of the glass fibre cables 9, 10, 11 are directed substantially transversely to the driving direction of the vehicle 1. The end of the glass fibre cable 9 is mounted in the number plate holder 5. The end of the glass fibre 10 is mounted to the front bumper 6, on the left-hand side thereof. The end of the glass fibre cable 11 is mounted to the rear bumper 7, on the right-hand side thereof. The ends of the glass fibres 9, 10, 11 are directed obliquely upwards at an angle of about 5 degrees to the road surface, so that they are directed more or less in the direction of the laser speed measuring device 101. The end of the glass fibre cable 10 is furthermore directed obliquely forwards at an angle of about 10 degrees to the plane that extends transversely to the driving direction, so that it is directed more or less in the direction of the laser gun 104.

When an external laser speed measuring device 101 detected, the central processing unit 3 will activate the laser detector/transmitter 8 to transmit interfering light or laser pulses via the glass fibre cables 9, 10, 11, so that the measuring device 101 will not be able to carry out a speed measurement. An example of such a jamming method, using laser pulses, is described in WO 97/21110, and will therefore not be described once again herein. The present device preferably transmits laser pulses at constantly varying random intervals. For example, if the pulse frequency of the external measuring apparatus is 80 kHz, i.e. an interval of 12.5 ms, the laser pulses are returned with a randomly varying interval within the 12.3-12.7 ms range. The central processing unit calculates a delay for the light pulses to be sent through the glass fibre cable 11, which delay depends on the current speed of the vehicle 1 and the length of the vehicle, such that it will transmit the light pulses when the end of the cable 11 is present at the location of the laser speed measuring device 101. Alternatively, the external laser pulses can be detected by means of the cable 11 and interfering light pulses can be directly returned via said cable.

The invention claimed is:

1. A vehicle provided with a device comprising a central processing unit, at least one detector connected to said central processing unit, which detector comprises at least one detection surface and which is designed for detecting, in a detection direction, laser pulses or a light beam coming from external measuring apparatus which emits said laser pulses or light beam for the purpose of detecting a vehicle and/or measuring the speed of a vehicle, and at least one transmitter connected to the central processing unit, which transmitter comprises a transmission surface and which is designed for transmitting light pulses in a transmission direction that is substantially the same as said detection direction, which central processing unit is designed for causing the transmitter to transmit a series of light pulses upon detection of laser pulses or a light beam, wherein the detection surface and the transmission surface are connected to the vehicle in such a manner that the detection surface and the transmission surface are oriented substantially transversely to the driving direction of the vehicle and the centre of the transmission surface is less than 40 cm removed from the front or the rear of the vehicle.

2. The vehicle according to claim 1, wherein the detection surface is provided near the front side or near the rear side of the vehicle.

3. The vehicle according to claim 1, wherein the centre of the detection surface is less than 5 cm removed from the front or the rear of the vehicle.

4. The vehicle according to claim 1, wherein the detection surface and/or the transmission surface are or is mounted in, to, or near the front bumper or the rear of the vehicle.

5. The vehicle according to claim 1, wherein the detection surface and/or the transmission surface is (are) mounted in the front number plate holder of the vehicle.

6. The vehicle according to claim 1, wherein the device comprises at least two transmission surfaces, oriented parallel to each other, for each detector, the first transmission surface being mounted near the front of the vehicle and the second transmission surface being mounted near the rear of the vehicle.

7. The vehicle according to claim 1, wherein the central processing unit is designed for causing the transmission surface provided near the front of the vehicle to transmit said series of light pulses immediately after the detector has detected laser pulses.

8. The vehicle according to claim 1, wherein the device is designed for causing laser pulses to be transmitted at a varying interval within a predetermined range.

9. The vehicle according to claim 1, wherein the detection surface is oriented obliquely upwards at an angle of about 1-20 degrees to the road surface.

10. The vehicle according to claim 1, wherein the detection surface or one of the detection surfaces is oriented obliquely forwards at an angle of 5 to 20 degrees.

11. The vehicle according to claim 10, wherein the obliquely forwardly oriented detection surface is present near the side of the vehicle, being oriented at an angle across the front of the vehicle.

12. The vehicle according to claim 1, wherein the detector comprises a glass fibre cable whose first end is mounted in front of the detector, being directed towards said detector, and whose second end forms the detection surface, being provided with connecting means for connecting said second end to the vehicle in such a manner that laser pulses from the external measuring apparatus can be received by the glass fibre cable and be guided to the detector.

13. A vehicle provided with a device comprising a central processing unit, at least one transmitter connected to said central processing unit, which transmitter comprises a transmission surface and which is designed for transmitting light pulses in a transmission direction, which central processing unit is designed for causing the transmitter to transmit a series of light pulses, wherein the transmission surface is connected to the vehicle in such a manner that the connection surface is oriented substantially transversely to the driving direction of the vehicle, wherein the transmission surface is provided near the front or near the rear of the vehicle and the centre of the transmission surface is less than 40 cm removed from the front or the rear of the vehicle.

14. A method for fitting a vehicle with a device comprising a central processing unit, at least one detector connected to said central processing unit, which detector comprises at least one detection surface and which is designed for detecting, in a detection direction, laser pulses or a light beam coming from external measuring apparatus which emits said laser pulses or light beam for the purpose of measuring the speed of a vehicle, and at least one transmitter connected to the central processing unit, which transmitter comprises a transmission surface and which is designed for transmitting light pulses in a transmission direction that is substantially the same as said detection direction, wherein the central processing unit is designed for causing the transmitter to transmit a series of light pulses upon detection of laser pulses or a light beam by the detector, wherein the detection surface and the transmission surface are connected to the vehicle in such a manner that the detection surface and the transmission surface are oriented substantially transversely to the driving direction of the vehicle and the centre of the transmission surface is less than 40 cm removed from the front or the rear of the vehicle.

15. A method for providing a device in a vehicle, which device comprises a central processing unit, at least one transmitter connected to said central processing unit, which transmitter comprises a transmission surface and which is designed for transmitting light pulses, which central processing unit is designed for causing the transmitter to transmit a series of light pulses, wherein the transmission surface is connected to the vehicle in such a manner that the transmission surface is oriented substantially transversely to the driving direction of the vehicle, wherein the transmission surface is provided near the front or near the rear of the vehicle and the centre of the transmission surface is less than 40 cm removed from the front or the rear of the vehicle.

16. The vehicle according to claim 1, wherein the detection surface and the transmission surface are the same surface.

17. The vehicle according to claim 1, wherein the laser pulses or the light beam coming from the external measuring apparatus and the transmitted series of light pulses pass through a same glass fibre cable.

\* \* \* \* \*

UNITED STATES PATENT AND TRADEMARK OFFICE
CERTIFICATE OF CORRECTION

PATENT NO.       : 8,629,392 B2
APPLICATION NO. : 13/124313
DATED            : January 14, 2014
INVENTOR(S)      : De Wilde et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 349 days.

Signed and Sealed this
Twenty-second Day of September, 2015

Michelle K. Lee
*Director of the United States Patent and Trademark Office*